United States Patent [19]

Vicendese et al.

[11] 3,942,308

[45] Mar. 9, 1976

[54] CHEMICAL DISPENSING LAWN MOWER ARRANGEMENT

[76] Inventors: Anthony P. Vicendese, 50 Sutton Drive; Frank Vicendese, 617 Plainfield Ave., both of Berkeley Heights, N.J. 07922

[22] Filed: June 10, 1974

[21] Appl. No.: 477,595

[52] U.S. Cl. ................................. 56/16.8; 56/229
[51] Int. Cl.² ................................. A01D 35/22
[58] Field of Search ............ 56/295, 255, 229, 16.8, 56/17.5, 16.7, 16.9

[56] References Cited
UNITED STATES PATENTS

| | | | |
|---|---|---|---|
| 2,539,779 | 1/1951 | Grosso | 56/16.6 |
| 2,688,224 | 9/1954 | Hainke | 56/14.7 |
| 3,090,187 | 5/1963 | Livingston | 56/295 |
| 3,102,375 | 9/1963 | Troka et al. | 56/255 |
| 3,332,221 | 7/1967 | McCain | 56/295 |
| 3,375,644 | 4/1968 | Harper | 56/16.8 |
| 3,818,686 | 6/1974 | Haffner et al. | 56/11.1 |

*Primary Examiner*—Russell R. Kinsey
*Attorney, Agent, or Firm*—Howard R. Popper

[57] ABSTRACT

A combination power driven lawn mower and lawn care chemical dispensing machine is disclosed in which a hopper for dry granular chemicals is affixed to the top of the lawn mower frame in such a manner that the chemical may be dispensed over an area defined by the swath of lawn cut by the blade. In one embodiment, a trough type of hopper is positioned between the rear axles of the mower and has a dispensing area whose width is the diameter of the blade arc. In an alternative embodiment, a special type of dispensing blade is employed which is connected to the hopper by means of a communicating trunk cut through the bedplate of the mower.

3 Claims, 7 Drawing Figures

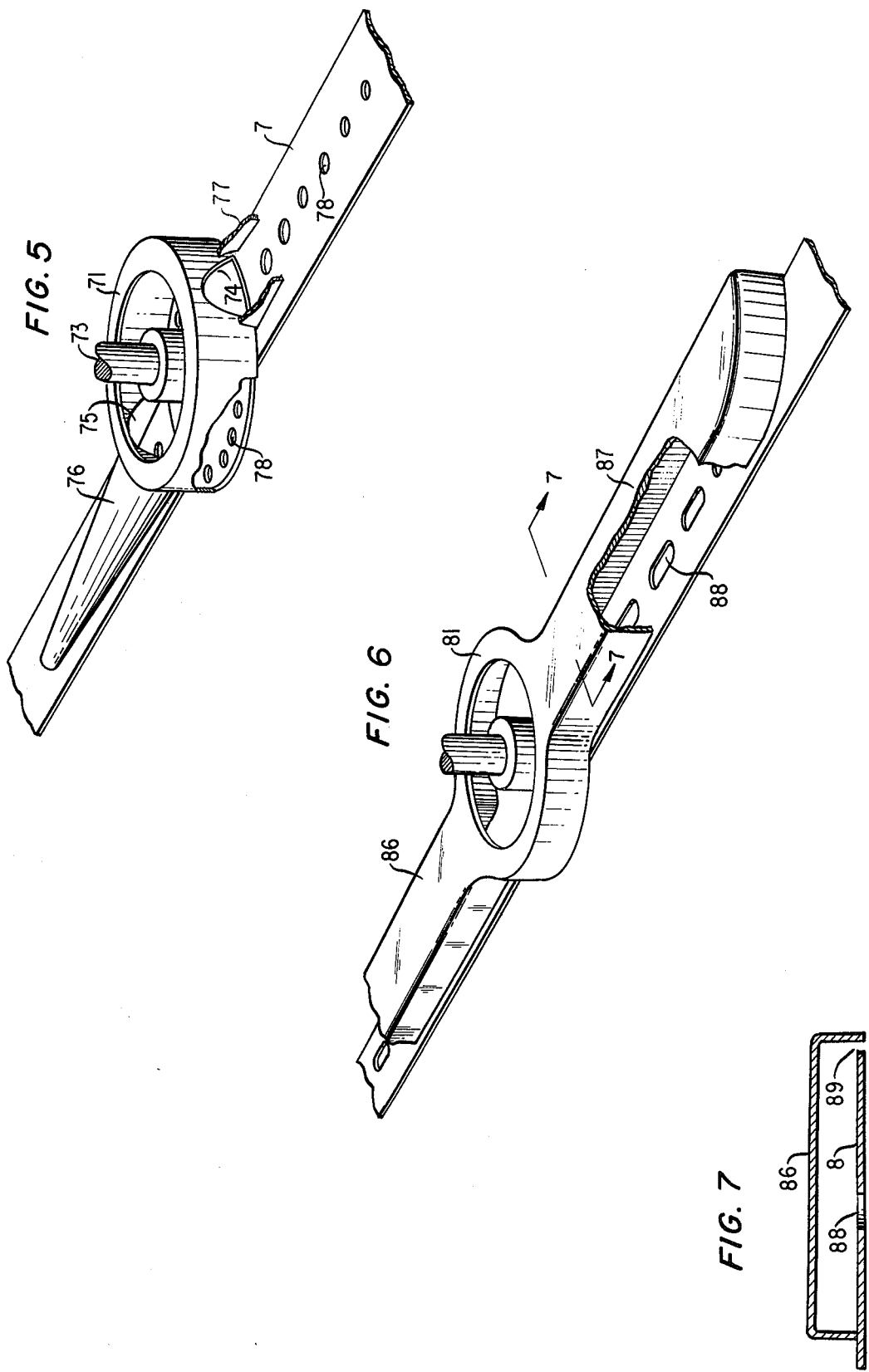

CHEMICAL DISPENSING LAWN MOWER ARRANGEMENT

This invention relates to lawn care equipment and more particularly to an improvement in power driven lawn mowers.

BACKGROUND OF THE INVENTION

The use of the gasoline powered lawn mower, especially the so-called "self-propelled" machine has greatly reduced the amount of manual labor involved in one phase of lawn care. As Americans continue to find more creative uses for their leisure time, however, the time required to be devoted to proper lawn maintenance is spent ever more reluctantly. Unfortunately, proper lawn care demands additional and appropriately timed maintenance than mere mowing. The lawn should be fertilized spring and fall. Pre-emergent weed control chemicals may have to be applied. Some lawns may need applications of crab grass and dandelion inhibitors and in many cases insect control chemicals to fight chinch bugs may be necessary. All of these operations require additional hours of labor that many people would rather spend elsewhere. Heretofore, each of the aforementioned tasks has had to be undertaken independently of and in addition to the weekly mowing job in an effective manner. Many home owners have therefore given up the effort and have employed professional lawn care companies to take over the care of their lawns.

It would be of great advantage and convenience if one or more of the lawn care operations involving the dispensing of lawn care chemicals could be combined with the tasks of mowing. Accordingly, we have devised an improved lawn mower which, particularly when the new lightweight lawn care chemicals are employed, can dispense these chemicals in an efficient and convenient manner which will neither interfere with the cutting of the grass nor collection of the cuttings, which confines the distribution of chemicals to a determinable area of the lawn and which has a chemical hopper that will not require refilling any more frequently than the intervals during which the lawn mower must be stopped to empty the grass catcher.

SUMMARY OF THE INVENTION

The foregoing and other objects and features of our invention are achieved in one illustrative embodiment in which an adjustable-coverage chemical dispensing hopper is affixed to the frame or body of a lawn mower in such a manner that the chemicals may be efficiently distributed over the width of the swath of lawn that has just been cut by the rotary blade of the mower. According to one aspect of our invention, the hopper is dimensioned to contain a load of chemicals sufficient to cover a normal swath of lawn that can be traversed while filling the conventional grass catcher bag. In one embodiment the hopper is positioned between the rear wheels of the mower in such a manner that its dispensing chute extends the width of the blade swath. An agitator fitted inside the hopper and adjacent the hopper chute is rotated as the mower covers the lawn so that its vanes feed the chemical granules from the hopper through the chute. The agitator may be linked by belt or friction drive to the lawn mower wheels or, preferably, mounted so as to be coaxial with the rear axle of the mower housing.

According to one aspect of our invention the rear idler wheels of the mower which conventionally are separated by no more than the blade swath diameter are now further extended to permit the hopper chute of our invention to have a transverse dimension equal to the blade swath.

It is a further aspect of our invention and one which is of particular utility in mowing machines that have the grass ejection chute rearwardly extended and upwardly raised to discharge the grass cuttings into a grass catcher positioned between the control handles (thus providing a lawn mower requiring a clearance no wider than the blade swath) to dispense the new lightweight chemical fertilizers from a dispensing hopper which is integrally attached to the mower base housing between the rear wheels.

In still another embodiment of our invention, a dispensing trunk is affixed to the mower body with its upper end communicating with a chemical storage hopper mounted atop the lawn mower housing and which discharges the contents of the hopper into a toroidal chamber affixed to or integral with the mower blade. Distributing channels radiate from the chamber along both arms of the blade carrying the chemical granules from the chamber to dispensing apertures in the blade arms from which apertures the granules are distributed as the blade rotates to cut the swath of grass.

BRIEF DESCRIPTION OF THE DRAWING

The foregoing and other objects and features of our invention may become more apparent by referring now to the drawing in which FIG. 1 show the side view of one illustrative embodiment of our invention in which the hopper is mounted on the lawn mower housing and having its agitator coaxial with the rear wheels of the mower;

FIG. 5 shows a centrifugal distributing cutting blade suitable for use with the embodiment of FIGS. 3 and 4;

FIG. 6 shows an alternative form of centrifugal distributing blade having elongated distributing holes and in which the central chamber is integral with the distributing cowl; and FIG. 7 is a section through one of the distributing cowls of the embodiment of FIG. 6.

GENERAL DESCRIPTION

Figure 1:
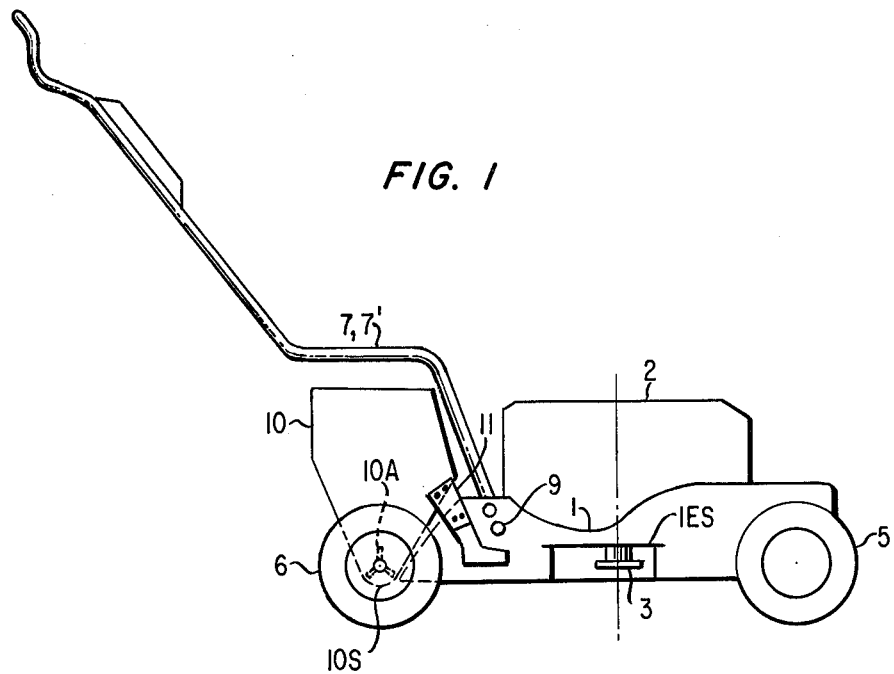

Referring now to FIG. 1, a side view of a lawn mower is shown having a base housing 1 supporting an engine 2 which drives rotary mowing blade 3. The mower has front wheels 5, 5' (see FIG. 2) which advantageously may be driven by engine 2 in the conventional manner (through drive means, not shown) and rear wheels 6, 6'. The control handle 7 is affixed to base plate 1 by means of mounting bracket 9.

Figure 2:
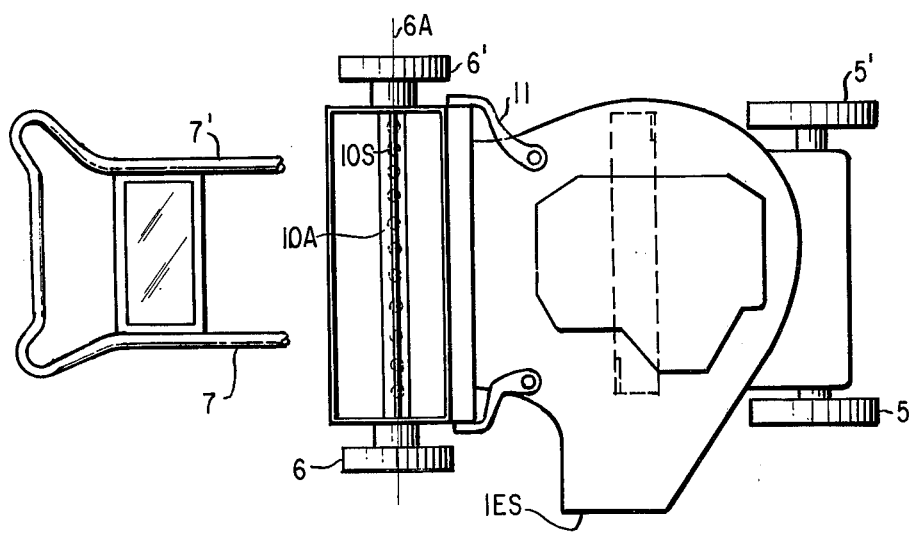
FIG. 2 shows a top view of the embodiment of FIG. 1.

In FIG. 2 a top view of our first embodiment is shown in which the rear wheels 6, 6' have been positioned further apart than the front wheels 5, 5'. In conventional mowers the spacing between the wheels 5, 5' and 6, 6' is dictated by the swath diameter cut by rotary blade 3. Further, in conventional mowers the spacing between wheels 5 and 5' is quite arbitrary but is usually less than that of the blade swath and similarly the spacing between wheels 6 and 6' is also quite arbitrary and also usually somewhat less than the blade swath. In accordance with our invention, however, a chemical dispensing hopper 10 is positioned between wheels 6 and 6' which have been spaced apart so that dispensing chute 10S may have a transverse length equal to the length of blade 3. Hopper 10 is affixed to base plate 1 by brackets 11. Internal to dispensing hopper 10 is an agitator 10A whose drive shaft is integral with or concentrically affixed to rear wheel axle 6A.

In operation, the hopper 10 is filled from a bag of lawn care chemicals. Hopper 10 is dimensioned to contain a load of lawn care chemicals so that it will not be exhausted prior to the time that the engine 2 of the mower must be stopped to empty the usual grass bag (not shown) attached to ejection chute IES. With the use of the modern, controlled-concentration lawn care chemicals even such comparatively bulky products as fertilizer may be loaded into hopper 10 without requiring a refilling more often than at the intervals when the grass catcher must be emptied. The weight-load of such chemcials for a mower having a 21-inch width blade will normally not exceed some 15 to 18 pounds for a 5,000 square foot application. Normally, no more than 5,000 square feet of grass can be cut before it is necessary to empty the grass catcher. Accordingly, an integrated lawn care tool has been disclosed in FIGS. 1 and 2 whereby mowing can be accomplished at the same time that lawn care chemicals can be efficiently distributed over the mown swath.

Figure 3:
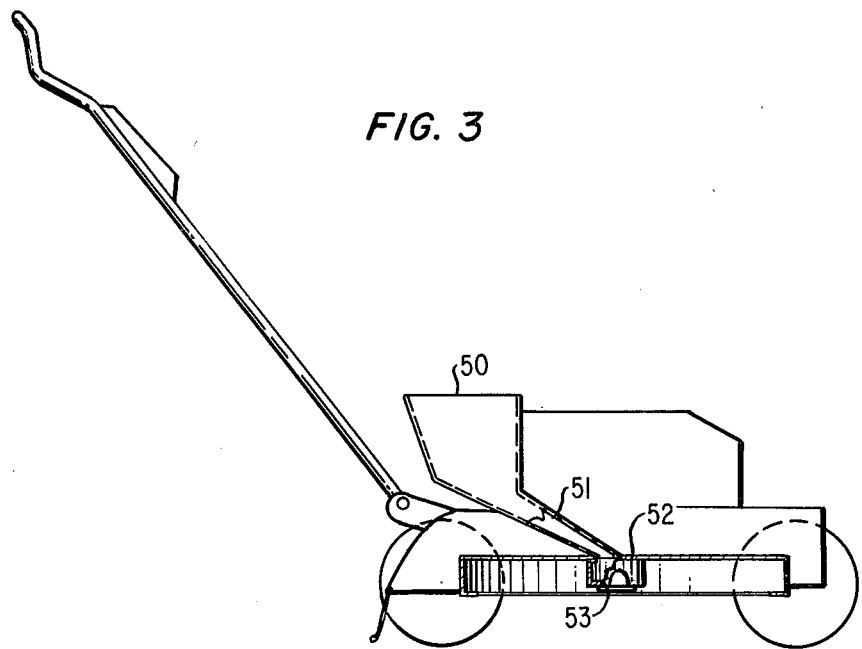
FIG. 3 shows the side view of and alternative embodiment in which the mower is equipped with a dispensing trunk communicating with a centrifugal distributing cutting blade.
Figure 4:
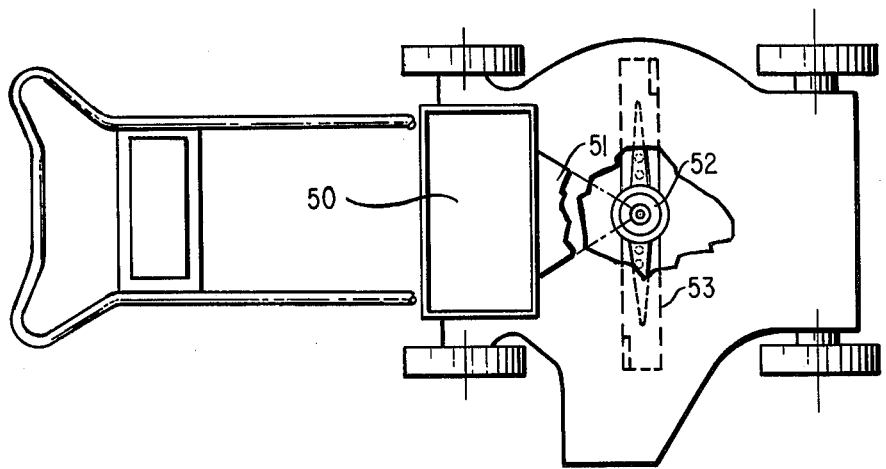
FIG. 4 shows a top view of the embodiment of FIG. 3.

In FIGS. 3 and 4 there is shown, respectively, side and top views of an alternative embodiment of our invention in which a chemical dispensing hopper 50 is fitted atop the base housing of the mower and a special chemical dispensing blade 53 replaces the conventional mower blade 3 of FIGS. 1 and 2. The mower blade 53 of FIGS. 3 and 4 (which blade is shown in greater detail in FIGS. 5, 6, and 7) is fitted with a drum chamber 52. Between the chemical dispensing hopper 50 and the drum chamber 52, a communicating trunk is provided which extends through the mower base housing so that the contents of hopper 50 may be fed to blade 53.

Referring now to FIGS. 5 and 6, there are shown two alternative embodiments for the dispensing blade employed in the mower of FIGS. 3 and 4. In FIG. 5, a blade 7 is affixed to the lower end of the motor drive shaft 73 by means of the usual shaft end nut, lock washer and washer arrangement, not shown. The sharpened cutting edges of the blade 7 have also not been shown. In accordance with our invention, a central annular chamber 71 is affixed to the upper central portion of blade 7 and concentric with drive shaft 73.

The annular drum chamber 71 is provided with two apertures 74 and 75 to which apertures are affixed radial distributing cowls 76 and 77. Cowls 76 and 77 and chamber 71 may be affixed to blade 7 by spot welding or any other convenient method. Cowls 76 and 77 define a dispensing channel along the upper surface of blade 7. Beneath cowls 76 and 77 and through blade 7 are drilled a plurality of distributing holes 78 radiating outwardly of central chamber 71. Holes 78 may advantageously be of differing diameter to compensate for the centrifugal effects of rotation on the granules of chemical fed into chamber 71 and hurled outwardly through the dispensing channel defined by cowls 76 and 77.

Referring now to FIG. 6, there is shown an alternate embodiment in which the central chamber 81 is integral with distributing cowls 86 and 87 all of which are affixed to the upper surface of blade 8. In addition, an alternate form of distributing aperture 88 has been cut through the blade beneath the cowls 86 and 87. FIG. 7 shows a section through cowl 86 showing how the trailing edge of the cowl may be allowed to overlap the trailing edge of blade to facilitate the distributing of certain types of granular material through the edge gap 89.

Accordingly, we have shown several alternative embodiments of a chemical dispensing lawn mower together with a new type of blade useful therewith. Furtherand other modifications may be apparent to those of skill in the art without departing from the spirit and scope of this invention.

What is claimed is:

1. A power lawn mower comprising a base housing, a pair of front driving wheels and a pair of rear idler wheels attached to said base housing, an engine mounted on said base housing, rotary blade means positioned beneath said base housing and connected to be driven by said engine, hopper means integrally attached to said base housing between said rear wheels and having a width substantially equal to that of said rotary blade means, said hopper means having an agitator and a dispensing chute.

2. A power lawn mower as in claim 1 wherein said agitator includes axle means colinear with the axis of said rear wheels.

3. A power lawn mower as in claim 2 wherein said rear wheels are separated from each other by a greater distance than the spacing between said front wheels and wherein said dispensing chute extends along the length of said agitator axle means throughout a length substantially equal to the length of said rotary blade.

* * * * *